United States Patent
Kleppinger et al.

(10) Patent No.: US 10,938,154 B2
(45) Date of Patent: Mar. 2, 2021

(54) SECURE ADAPTER DEVICE

(71) Applicant: NCR Corporation, Atlanta, GA (US)

(72) Inventors: Michael Andrew Kleppinger, Buford, GA (US); Ulrich Kaiser, Langenneufnach (DE); Philipp Schmidt, Eugendorf (AT)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/526,719

(22) Filed: Jul. 30, 2019

(65) Prior Publication Data

US 2021/0036461 A1  Feb. 4, 2021

(51) Int. Cl.
| | | |
|---|---|---|
| *H01R 13/62* | (2006.01) | |
| *H01R 13/627* | (2006.01) | |
| *H01R 13/52* | (2006.01) | |

(52) U.S. Cl.
CPC ..... *H01R 13/6271* (2013.01); *H01R 13/5202* (2013.01)

(58) Field of Classification Search
CPC .................. H01R 13/6271; H01R 13/5202
See application file for complete search history.

(56) References Cited

U.S. PATENT DOCUMENTS

| | | | | |
|---|---|---|---|---|
| 6,254,418 B1* | 7/2001 | Tharp | ................ | H01R 13/6335 439/352 |
| 6,364,685 B1* | 4/2002 | Manning | .............. | G02B 6/3879 439/354 |
| 7,037,129 B2* | 5/2006 | Lo | ........................ | H01R 13/562 439/352 |
| 7,092,256 B1* | 8/2006 | Salazar | ................. | G06F 13/378 361/679.32 |
| 7,104,809 B1* | 9/2006 | Huang | ................. | G06K 19/077 439/142 |
| 7,329,137 B2* | 2/2008 | Martin | ................. | H01R 13/633 439/344 |
| 7,540,749 B1* | 6/2009 | Hall | ..................... | H01R 13/516 439/135 |
| 7,635,272 B2* | 12/2009 | Poppe | ................ | H01R 13/6397 439/133 |

(Continued)

OTHER PUBLICATIONS www.Powerdusb.Org: "Retail USB, USB PlusPower, USB +Power"Feb. 11, 2005 (Feb. 11, 2005), XP055224858, Retrieved from the Internet: URL:http//www.poweredusb.org/pdf/PoweredUSB_v08g.pdf [retreived on Oct. 30, 2015] * paragraphs [03.3], [3.5.1.3]; figures 5-7,11 *.

(Continued)

*Primary Examiner* — Truc T Nguyen
(74) *Attorney, Agent, or Firm* — Schwegman, Lundberg & Woessner

(57) ABSTRACT

A powered and secure device is provided. The device includes a terminal, an adapter, a self-latching mechanism and a secure housing. The terminal is adapted to be inserted into a host terminal device port. The self-latching mechanism adapted to secure or lock the device within the device port when the device is inserted into the device port. The secure housing adapted to be locked, unlocked, assembled, and disassembled. Access to the adapter is available when the secure housing is disassembled. The adapter includes a terminal slot for receiving and removing second devices.

12 Claims, 2 Drawing Sheets

(56) References Cited

U.S. PATENT DOCUMENTS

| | | | | |
|---|---|---|---|---|
| 7,985,091 B1* | 7/2011 | Fu | ............................ | H01R 31/06 |
| | | | | 439/345 |
| 8,308,494 B1* | 11/2012 | Zhao | ....................... | H01R 13/60 |
| | | | | 439/131 |
| 9,448,370 B2* | 9/2016 | Xue | ....................... | G02B 6/3821 |
| 9,553,408 B2* | 1/2017 | Ahn | ........................ | H01R 24/62 |
| 9,825,403 B2* | 11/2017 | De Dios Martin | .. | H01R 13/633 |
| 2004/0110408 A1* | 6/2004 | Wong | .................... | H01R 13/508 |
| | | | | 439/372 |
| 2005/0202698 A1* | 9/2005 | Miao | ........................ | G06F 21/88 |
| | | | | 439/133 |
| 2006/0052001 A1* | 3/2006 | Parker | ..................... | H01R 24/62 |
| | | | | 439/358 |
| 2006/0086792 A1* | 4/2006 | Chen | .................... | G06K 7/0034 |
| | | | | 235/441 |
| 2007/0218728 A1* | 9/2007 | Jow | .................. | G06K 19/07741 |
| | | | | 439/159 |
| 2007/0259570 A1* | 11/2007 | Moshayedi | ........... | G06K 7/0013 |
| | | | | 439/638 |
| 2010/0197165 A1* | 8/2010 | Mundt | ................... | H01R 13/60 |
| | | | | 439/501 |
| 2010/0267259 A1* | 10/2010 | Sun | ....................... | H05K 5/0278 |
| | | | | 439/131 |

OTHER PUBLICATIONS

CKC Anonymous: "Data Sheet", Dec. 31, 2010 (Dec. 31, 2010), XP055689433, Internet Retrieved from the Internet: URL:https://www.delock.de/produkte/G_91678/merkmale.html [retrieved on Apr. 27, 2020] * the whole Document *.

* cited by examiner

SECURE ADAPTER DEVICE

BACKGROUND

Many computer-based terminals include peripheral ports for connecting peripheral devices. These devices are interfaced to a host terminal using a variety of different interface port formats, such as secure digital (SD), micro SD, subscriber identity module (SIM), and Universal Serial Bus (USB). Most host terminals include a variety of ports that support USB dongles. Rarely does a host terminal include ports for SD cards, micro SD cards, or SIM cards. Such devices are meant to be portable; as a result, insertion and removal of the devices from the host terminal are insecurely achieved by an operator.

The portability of the devices is attractive and convenient, but such devices do not conform to many governmental security regulations required of businesses with respect to capturing and tracking audit information for hardware devices used in commerce.

SUMMARY

In various embodiments, secure adapter devices are presented.

According to an embodiment, a secure peripheral adapter device is provided. The device includes a terminal, a self-latching mechanism, and an adapter. The terminal is adapted to be inserted into a port of a host terminal. The self-latching mechanism is adapted to secure the terminal inside the port and activated upon insertion of the terminal into the port. The adapter includes an adapter slot terminal, the adapter is coupled to the terminal and the adapter slot terminal is adapted to receive a second device for interfacing the second device to the host terminal through the device.

DETAILED DESCRIPTION

Figure 1:
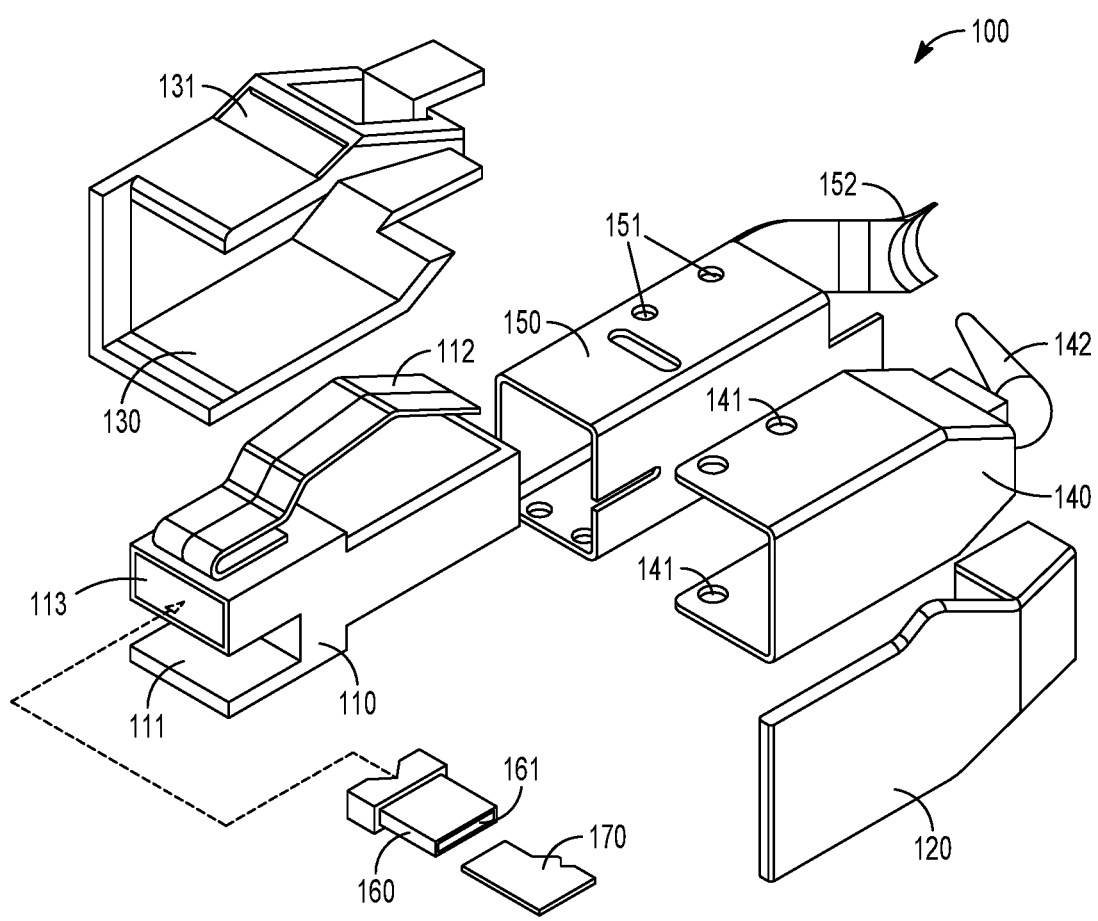
FIG. 1 is a diagram of a secure adapter device, according to an example embodiment.

FIG. 1 is a diagram of a secure adapter device 100, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the secure adapter device 100 presented herein and below.

The secure adapter device 100 includes main housing 110, a first side cover 120, a second side cover 130, a first side shell housing 140, and a second shell housing 150. Internal to the main shell housing 110 is an integrated adapter 160 (illustrated in FIG. 2A); adapter 160 is wired into main housing 110 through aperture 113. The adapter 160 permits insertion and removal of a different type of peripheral device, such as the micro SD card 170 in the FIG. 1

The main housing 150 also includes a terminal connector 111 by which an assembled version of the secure adapter device 100 can be interfaced to a corresponding peripheral port on a host computer terminal. The main housing 150 also includes a latching mechanism 112 by which the main housing 150 is secured into an assembled version of the secure adapter device 100. The latching mechanism 112 (described more completely below) also provides resistance against and within a slot 131 formed in the second side cover 130 in an assembled version of the secure adapter device 100.

The main housing 150 is adapted to slide into the second shell housing 140. The first shell housing 140 includes apertures 141 that slide over, align with, and latch onto raised knobs 151 of the second housing 150. The main housing 150 includes a rearward extending member 152 that snaps and fits snugly against the second shell housing's corresponding rearward member 142. The second side cover 130 is then maneuvered over the combination of the main housing 110 that is inside of the main shell housing 150 with the attached second side housing 140, such that the latching mechanism 112 is interfaced into slot 131. The first side cover 120 is then aligned and snapped into the open end of the second side over 130 forming an assembled version of the secure adapter device 100 (shown in the FIGS. 2A and 2B).

In an embodiment, the terminal 111 is a USB terminal for a 12-volt (V) host terminal peripheral port. Many retail terminals for Point-Of-Sale (POS) terminals or Self-Service Terminals (SST) include internal 12 V USB ports that are internal to a housing of the terminal and are not noticeable or available from an exterior surface of the housing. This was done to permit USB compatible peripherals to be integrated into the housing, such ports can and do support a connection for secure adapter device 100.

The secure adapter device 100 also includes a self-latching mechanism 112 that secures the secure adapter device 100 within the 12 V USB host terminal peripheral port, preventing easy removal of the secure adapter device 100 from the internal 12V USB host terminal peripheral port.

The self-latching mechanism 112 secures the secure adapter device 100 to the port into which it is interfaced (inserted) by exerting force against an inside top of the peripheral port. An operator uses a thumb to press down on sell-latching mechanism 112, which allows the terminal 111 and front portion of the secure adapter device 100 to fit inside the 12 V port of the hot terminal. In an initial biased state, the self-latching mechanism 112 impedes insertion of the terminal 111 into the port because mechanism 112 is biased to a state that exceeds a size of the opening for the peripheral port. When the user presses down on 112, the area surrounding the front of the secure adapter device 100 is decreased to a sufficient size to fit into a 12 V USB peripheral connection port. Once inserted into the port, the operator releases the downward pressure from the thumb, and the self-latching mechanism 112 returns to its initial biased state, which results in a portion of 112 that is inside the 12 V USB port to exert an upward force against the inside and top portion of the 12 V USB port. The force is sufficient enough to prevent removal of the secure adapter device 100 from the port unless 112 is pressed down by the operator.

It is noted that other self-latching mechanism can be used as well, such as side members that extend from the sides of outer sides of terminal 111 having a rounded shape that permit the side members to fold in when the terminal 111 is slid into the 12 V USB port. Again, the side members are biased to be extended from the sides, such that once the terminal 111 is inserted into the port, the appendages return to the biased state and exert pressure on the corresponding inside portions of the port. A lever or button may be provided that allows the side members to collapse for removal of the secure adapter device 100 from the port. The members may also be manufactured on the portion 113 of the secure adapter device 100 located above the terminal 111. In some cases, a single rather than dual members may be used as a self-latching mechanism.

The adapter 160 is accessible from the main housing 110 such that a micro SD card 170, SIM card, or SD card can be inserted and removed from a slot of the adapter 161.

Access to the slot 161 may be obscured by the outer surface of the main housing 110 and accessible through a push button or lever that causes a portion of the main housing 110 to open for access to the slot 161.

In another case, access to the slot 161 may be manufactured such that is accessible from the outer surface of the main housing 110 on a side surface, top surface, rear surface without removing any portion of the main housing 110 for purposes of inserting the micro SD card 170, SIM card, or SD card.

In an embodiment, access to the slot 161 is through aperture 113 providing it is a sufficient distance inside aperture 113 so as to not interfere with componentry associated with the host peripheral port when the secure adapter device 100 is secured into the host peripheral port.

In an embodiment, the adapter 160 is built into the main housing 110 through wiring the USB connection pins of the terminal 111 directly to the corresponding adapter pins of the adapter 160.

In an embodiment, the main housing 110 includes a female port connection that allows the adapter 160 having a male port end to connect within the main housing. This allows the adapter 160 to be removed and a different adapter 160 for a different type of card to be inserted. For example, an adapter 160 having a slot 161 for connecting a micro SD card 170 can be removed from the main housing 110 and a different adapter inserted for connection a SIM card or an SD card.

Figure 2A:
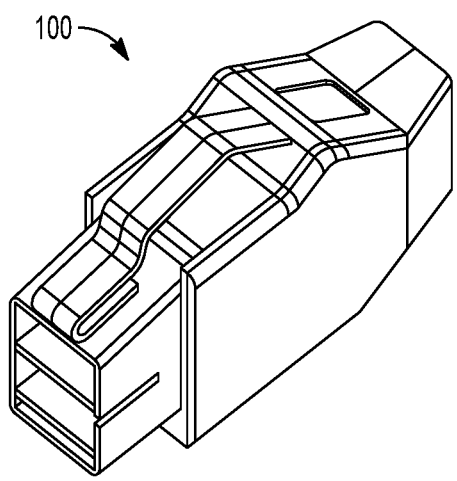
FIG. 2A is a diagram of a front-facing view of an assembled secure adapter device, according to an example embodiment.

FIG. 2A is a diagram of a front-facing view of an assembled secure adapter device, according to an example embodiment.

Figure 2B:
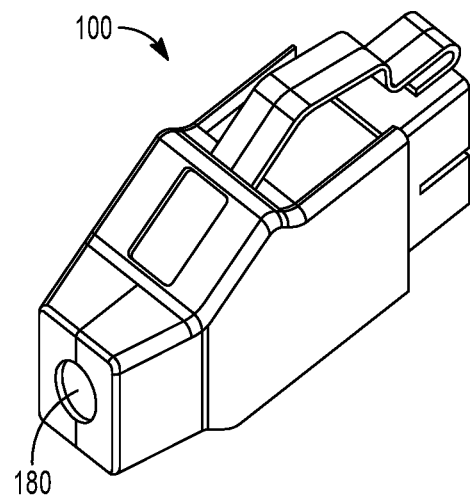
FIG. 2B is a diagram of a rear-facing view of an assembled powered and security adapter device, according to an example embodiment.

FIG. 2B is a diagram of a rear-facing view of an assembled powered and security peripheral adapter device, according to an example embodiment.

The rear-facing view includes a rubber plug 180 that seals the members 152 and 142 together and prevents disassembly of the device 100 into the component pieces illustrated in the FIG. 1. The plug 180 may be removed by turning the plug 180 in a predesignated direction for a quarter turn. The plug includes a knob that fits into the opening made by the members 152 and 142. The opening formed by the adjoined members 152 and 142 may also include a groove/ridge that forms nearly a complete circle within the adjoined members 152 and 142 but includes a portion that lacks the groove/ridge. In this manner, the plug 180 can be inserted into the opening by aligning the plug knob to the portion within the opening that lacks the groove or ridge and then twisting the plug 180 in either direction, such that the knob is now behind the groove or ridge and locked into place sealing the device 100.

It is noted that the plug 180 having a knob is but one example of how the device 100 can be sealed, others may be used as well without departing from the beneficial teachings presented herein. For example, a small latch may be released that allows the component pieces to be separated through insertion of a small specialized key or pin into a hole through one or more of the components. The specialized key or pin trips the latch, allowing the outer component pieces to separate. This same type of pin or key based approach may also be used to gain access to the main housing 110 for purposes of accessing slot 161 of adapter 160 to remove micro SD card 170 and insert a different micro SD card.

The contents and programming of the micro SD card 170 can be any process or set of processes intended to be secure. The secure adapter device 100 permits the micro SD card 170 to be made secure almost as if the micro SD card 170 was an internal hardware component of the host computer to which it is ultimately attached. Once inserted into a 12 V USB port, the secure adapter device 100 is secured within the port through activation of the self-latching mechanism 112 (as discussed above). Furthermore, once removed from the port, the secure adapter device 100 requires a specific technique by which the components of the secure adapter device 100 can be disassembled and by which access can be made to the micro SD card 170 from the slot 161 of the adapter 160. In this way, the micro SD card 170 is secured within the secure adapter device 100.

In an embodiment, the adapter 160 is a USB to micro SD adapter (as is illustrated in the FIG. 1).

In an embodiment, the adapter 160 is a USB to SD adapter.

In an embodiment, the adapter 160 is a USB to SIM adapter.

In an embodiment, the adapter 160 is removable for the main housing 110 and capable of being swapped out with a different adapter 160.

In an embodiment, the secure adapter device 100 is a 12 V secure adapter device 100 designed to fit into and interface with a 12 V USB port of a host terminal.

In an embodiment, the 12 V USB port is located within an internal housing of the host terminal and is not accessible from an exterior surface of the housing. In other words, the housing has to be removed from the host terminal to access the 12 V USB port into which the secure adapter device 100 is securely inserted with self-latching via the self-latching mechanism 112.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A device, comprising:
   a terminal adapted to be inserted into a port of a host terminal;

a self-latching mechanism adapted to secure the terminal inside the port and activated upon insertion of the terminal into the port;

an adapter includes an adapter slot terminal, wherein the adapter is coupled to the terminal and the adapter slot terminal is adapted to receive a second device;

a main housing comprising the terminal, the self-latching mechanism and the adapter; and a shell housing adapted to slide over and encase the main housing with the self-latching mechanism remaining outside the shell housing;

wherein the shell housing further comprises a first extended member that extends outwardly from a rear of the shell housing opposite a side associated with the terminal.

2. The device of claim 1 further comprising, a shell housing cover adapted to securely snap over the shell housing.

3. The device of claim 2 further comprising, wherein the shell housing cover includes a second member the extends outwardly from a rear of the shell housing cover and aligns with the first member of the shell housing, the first member and the second member adapted to form an aperture at adjoined ends.

4. The device of claim 3 further comprising, two side covers adapted to snap together and encase the shell housing cover and the shell housing.

5. The device of claim 4, wherein an inside portion of the adjoined ends of the first member and the second member form a discontinuous protruding ridge.

6. The device of claim 5 further comprising, a rubber or plastic plug including a protruding knob, wherein the plug adapted to fit inside the aperture with the protruding knob maneuvered to fit behind a portion of the discontinuous protruding ridge to seal the device and lock the shell housing and shell housing cover together.

7. The device of claim 6, wherein the device is adapted to be disassembled for access to the adapter slot terminal of the adapter located in or on the main housing for removing the second device or inserting a different device into the adapter slot terminal.

8. A Universal Serial Bus (USB) adapter device, comprising:

a main housing comprising: a terminal, a micro Secure Digital (SD)-to-USB adapter, and a self-latching mechanism;

a removable shell adapted to securely encase the main housing;

the terminal adapted to be inserted into a 12 Volt USB port of a host terminal;

the micro SD-to-USB adapter coupled to pins of the terminal within the main housing;

the micro SD-to-USB adapter includes a micro SD slot terminal adapted to receive micro SD cards inserted into the micro SD slot terminal; and the self-latching mechanism adapted to lock the main housing in to the 12 Volt USB port when the USB adapter device is inserted into the 12 Volt USB port;

wherein the main housing comprises a key activated latch adapted to open side covers of the main housing when a key is inserted into a hole of the main housing to trip an internal latch, wherein the micro SD slot terminal is accessed with the side covers of the main housing opened.

9. The USB adapter device of 8, wherein the micro SD slot terminal is accessible from an exterior facing surface of the main housing.

10. The USB adapter device of claim 8, wherein the removable shell includes a locking or sealing mechanism that locks or seals the removable shell around the main housing.

11. The USB adapter device of claim 8, wherein the locking or sealing mechanism is situated on an end opposite a second end where the terminal is located on the main housing.

12. The USB adapter device of claim 8, wherein the locking or sealing mechanism includes an internal latch or a plug.

* * * * *